US012625649B2

(12) United States Patent
Kang et al.

(10) Patent No.: US 12,625,649 B2
(45) Date of Patent: May 12, 2026

(54) VOLATILE MEMORY, SYSTEM ON CHIP AND ELECTRONIC DEVICE COMPRISING THE SAME

(71) Applicant: Samsung Electronics Co., Ltd., Suwon-si (KR)

(72) Inventors: Sang-Kyu Kang, Suwon-si (KR); Ki-Heung Kim, Suwon-si (KR); Dong Min Kim, Suwon-si (KR); Chang Sik Yoo, Suwon-si (KR); Ji Yoon Jeong, Suwon-si (KR); Hyun Duk Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/805,652

(22) Filed: Aug. 15, 2024

(65) Prior Publication Data

US 2025/0224901 A1 Jul. 10, 2025

(30) Foreign Application Priority Data

Jan. 9, 2024 (KR) ......................... 10-2024-0003344
Feb. 23, 2024 (KR) ......................... 10-2024-0026623

(51) Int. Cl.
*G06F 3/06* (2006.01)

(52) U.S. Cl.
CPC .......... *G06F 3/0659* (2013.01); *G06F 3/0625* (2013.01); *G06F 3/0673* (2013.01)

(58) Field of Classification Search
CPC ..... G06F 3/0659; G06F 3/0625; G06F 3/0673
See application file for complete search history.

(56) References Cited

U.S. PATENT DOCUMENTS 7,003,382 B2 2/2006 Honda
9,891,694 B2 2/2018 Taha et al.
(Continued)

FOREIGN PATENT DOCUMENTS

JP 2008-309069 A 12/2008
JP 2009-087170 A 4/2009
JP 2013-082388 A 5/2013

OTHER PUBLICATIONS

An article titled "NVDIMM Hands on Lab" Presented by AgigA Tech, Netwlist, SMART to the Flash Memory Summit 2014. (Year: 2014).*

(Continued)

*Primary Examiner* — Janice M. Girouard
(74) *Attorney, Agent, or Firm* — Fish & Richardson P.C.

(57) ABSTRACT

A volatile memory device comprises a memory cell array including a plurality of memory cells storing data, and control logic controlling read and write operations for the plurality of memory cells. The control logic is configured to receive a command instructing a self-refresh operation from an external host device, to perform the self-refresh operation in response to the received command, to request the external host device to transfer data stored in the plurality of memory cells in response to a performance time of the self-refresh operation having elapsed a first threshold time, to monitor a read command received from the external host device in response to receiving a notification of self-refresh operation termination and a read command from the external host device, and to enter a power off state in response to the read command not being received for a second threshold time.

20 Claims, 11 Drawing Sheets

(56)                  References Cited

U.S. PATENT DOCUMENTS

| 11,314,634 | B2 | | 4/2022 | Nomura et al. | |
| 2017/0262344 | A1 | * | 9/2017 | Shaw | G06F 3/0619 |
| 2019/0155366 | A1 | | 5/2019 | Graf et al. | |
| 2021/0201986 | A1 | | 7/2021 | Brandl et al. | |
| 2021/0349783 | A1 | * | 11/2021 | Dunn | G11C 11/40615 |
| 2022/0138129 | A1 | | 5/2022 | Inoue | |
| 2023/0317135 | A1 | | 10/2023 | Reina et al. | |

OTHER PUBLICATIONS

An artitle titled "NVDIMM Tecnical Brief . . . Solving Data Volatility" published Jan. 2014 and presented at the 2014 Storage Networking Industry Association (Year: 2014).*
Extended European Search Report dated Feb. 20, 2025 issued in European Patent Application No. 24196432.9-1211.

* cited by examiner

VOLATILE MEMORY, SYSTEM ON CHIP AND ELECTRONIC DEVICE COMPRISING THE SAME

CROSS-REFERENCE TO RELATED APPLICATION

This application claims priorities from Korean Patent Application No. 10-2024-0003344 filed on Jan. 9, 2024 and Korean Patent Application No 10-2024-0026623 filed on Feb. 23, 2024 in the Korean Intellectual Property Office, and all the benefits accruing therefrom under 35 U.S.C. 119, the contents of which in its entirety are herein incorporated by reference.

BACKGROUND

Various example embodiments relate to one or more of a volatile memory, a SoC, and an electronic device comprising the same.

Electronic devices may be installed in a vehicle to control and provide information of the vehicle. In an automotive system applied to vehicles, such as cars, trucks, sport-utility vehicles, etc., when the power of the vehicle is turned off, an ECU (Electronic Control Unit) for controlling the vehicle is also powered off. In this case, volatile memory, such as DRAM (Dynamic Random Access Memory), which is necessary or used for the operation of the ECU, performs a self-refresh operation to maintain the data stored in it even when the ECU is powered off. The current consumption due to this self-refresh operation increases with higher capacities of volatile memory. Therefore, research is needed or desired to improve this issue.

SUMMARY

Various example embodiments may provide a volatile memory device, a SoC (System on Chip), and/or an electronic device that can reduce operation power.

According to some example embodiments, there is provided a volatile memory device comprising a memory cell array including a plurality of memory cells configured to store data; and control logic configured to control read and write operations for the plurality of memory cells. The control logic is configured to receive a command instructing a self-refresh operation from an external host device, perform the self-refresh operation in response to the received command, request the external host device to transfer data stored in the plurality of memory cells in response to a performance time of the self-refresh operation having elapsed a first threshold time, monitor a read command received from the external host device in response to receiving a notification of self-refresh operation termination and a read command from the external host device, enter a power off state in response to the read command not being received for a second threshold time.

Alternatively, or additionally, according to some example embodiments, there is provided a SoC (System on Chip) comprising a first interface configured to communicate with a volatile memory device; a second interface configured to communicate with a non-volatile memory device; and a controller configured to control the first and second interfaces. The controller is configured to transmit a command to the volatile memory device instructing to perform a self-refresh operation, receive a request from the volatile memory device to transfer data stored in the volatile memory device to the non-volatile memory device, determine whether the volatile memory device has performed the self-refresh operation in response to a vehicle being powered off, upon determining that the volatile memory device has performed the self-refresh operation in response to the vehicle being powered off, transmit a read command to the volatile memory device in response to the request, upon determining that the volatile memory device has not performed the self-refresh operation in response to the vehicle being powered off, transmit a command instructing the self-refresh operation to the volatile memory device in response to the request, receive data corresponding to the read command from the volatile memory device, store the received data in the non-volatile memory device, receive a control signal from a sensor, and power on the volatile memory device in response to the control signal.

Alternatively or additionally according to various example embodiments, there is provided an electronic device configured to be included in a vehicle, the electronic device comprising a volatile memory device configured to store first data used for an operation of the vehicle; a non-volatile memory device configured to store second data used for the operation of the vehicle; a sensor configured to output a control signal in response to receiving a detection signal from at least one of a door, a seat, and a seat belt of the vehicle; and a System on Chip (SoC) configured to power on the volatile memory device in response to the control signal received from the sensor, and to control the volatile memory device and the non-volatile memory device. The volatile memory device is configured to receive a command instructing a self-refresh operation from the SoC, perform the self-refresh operation in response the received command, request the SoC to transfer data stored in the volatile memory device to the non-volatile memory device in response a performance time of the self-refresh operation having elapsed a first threshold time. The SoC is configured to upon determining that the volatile memory device has performed the self-refresh operation in response to the vehicle being powered off, in response to the request, transmit a read command to the volatile memory device, receive data corresponding to the read command from the volatile memory device, and store the received data in the non-volatile memory device, and upon determining that the volatile memory device has not performed the self-refresh operation in response to the vehicle being powered off, in response to the request, transmit a command instructing the self-refresh operation the volatile memory device.

The technical purposes of various embodiments are not limited to the technical purposes as mentioned above, and other technical purposes as not mentioned will be clearly understood by those of ordinary skill in the art from following descriptions.

BRIEF DESCRIPTION OF THE DRAWINGS

FIG. 4 is a diagram illustrating a volatile memory device of FIG. 3.

DETAILED DESCRIPTION OF VARIOUS EXAMPLE EMBODIMENTS

Hereinafter, various example embodiments will be described with reference to the accompanying diagrams.

Figure 1:
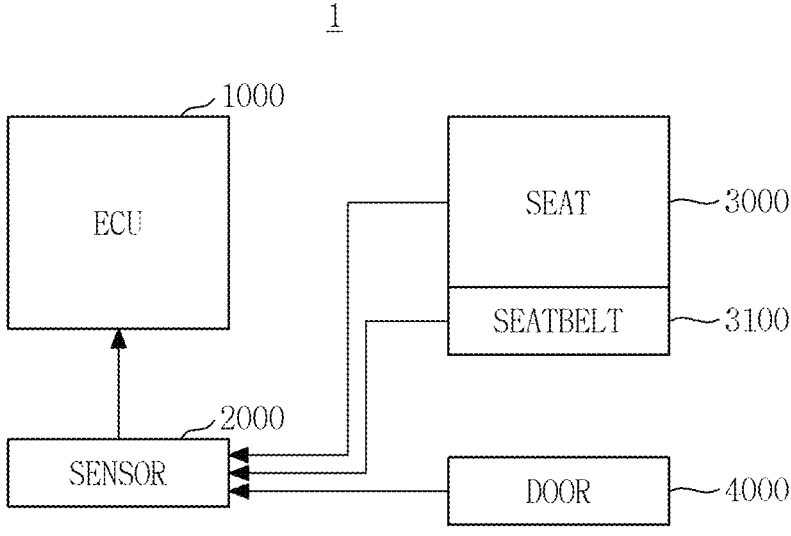
FIG. 1 is a diagram illustrating an electronic device according to some example embodiments.
Figure 2:
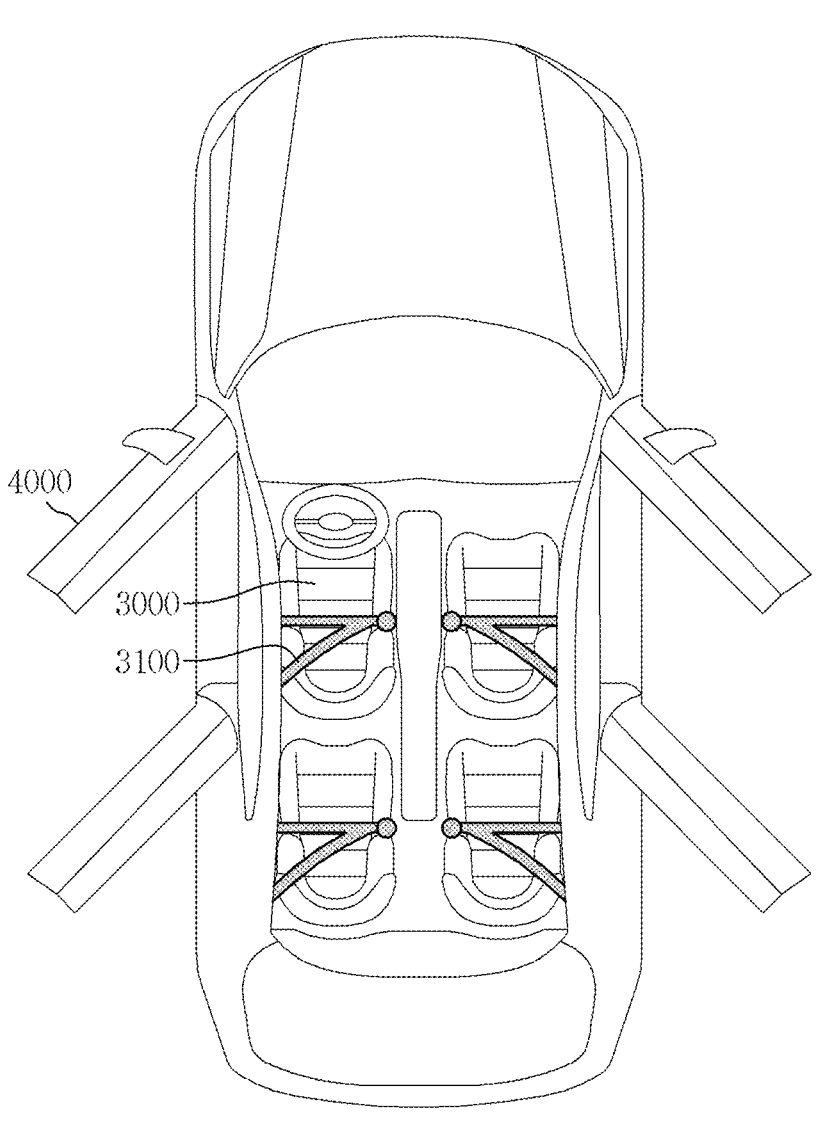
FIG. 2 is a diagram for explaining a sensor of FIG. 1.
Figure 3:
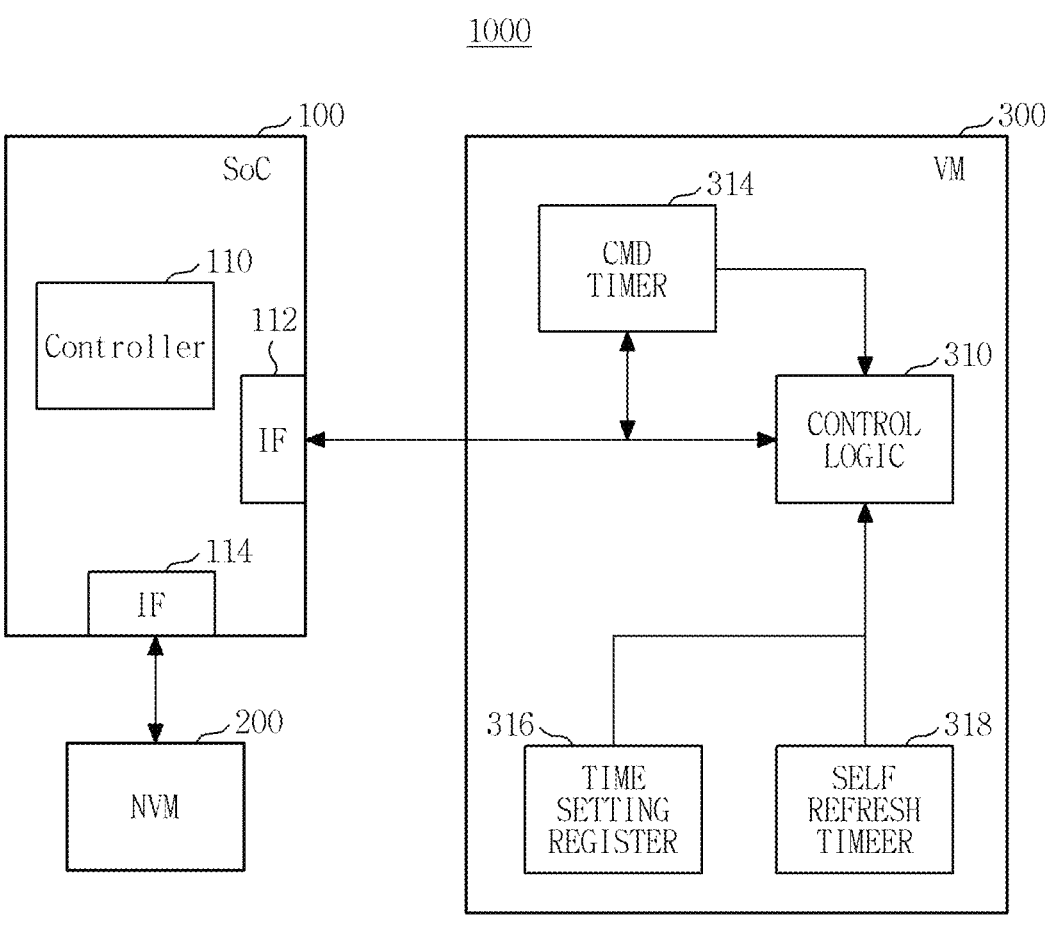
FIG. 3 is a diagram illustrating an ECU (Electronic Control Unit) of FIG. 1.

FIG. 1 is a diagram illustrating an electronic device according to some example embodiments. FIG. 2 is a diagram for explaining a sensor of FIG. 1. FIG. 3 is a diagram illustrating an ECU (Electronic Control Unit) of FIG. 1.

Referring to FIG. 1, an electronic device 1 may include an ECU (Electronic Control Unit) 1000, and a sensor 2000.

In some example embodiments, the electronic device 1 may be installed in (or may be configured to be installed in) a vehicle. In some example embodiments, the electronic device 1 may constitute or be included in an automotive system used for controlling a vehicle. Hereinafter, an electronic device 1 will be described as being installed in a vehicle, but example embodiments are not limited thereto.

The ECU 1000 may control the vehicle and/or provide information about the vehicle, for example to one or more users.

Referring to FIGS. 1 and 2, the sensor 2000 may detect motions of one or more of a seat 3000, a seat belt 3100, and a door 4000 of a vehicle, and may transmit a control signal to the ECU 1000 when motions are detected.

For example, when the door 4000 is opened or closed, the sensor 2000 may detect such movement and transmit a control signal to the ECU 1000. Additionally or alternatively, the sensor 2000 may detect such movement when a person or animal sits on the seat 3000 and transmit a control signal to the ECU 1000. Alternatively or additionally, the sensor 2000 may detect such movement when a person pulls the seat belt 3100 and transmit a control signal to the ECU 1000. Alternatively or additionally, the sensor 2000 may detect such movement when a person couples the seat belt 3100 to a safety buckle and transmit a control signal to the ECU 1000.

The ECU 1000 receiving the control signal from the sensor 2000 may recognize that power on of the vehicle is imminent and perform an operation necessary for power on of the vehicle. A more detailed description thereof will be described later.

Although four seats 3000 are illustrated in FIG. 2, example embodiments are not limited thereto. For example, there may be more than four seats or less than four seats. Additionally or alternatively, although four doors 4000 are illustrated in FIG. 2, example embodiments are not limited thereto. For example, there may be more than four doors 4000 or less than four doors 4000. Additionally or alternatively, although a driver's seat is illustrated in the left in FIG. 2, example embodiments are not limited thereto. For example, the driver's seat may be on the right. Alternatively or additionally, there may not be a steering wheel included in the car (e.g., the car may be an autonomous vehicle).

Referring to FIG. 3, the ECU 1000 may include a SoC (System On Chip) 100, a non-volatile memory device 200, and a volatile memory device 300.

The SoC 100 may include, for example, a microcontroller, and may control the overall operation of the ECU 1000. For example, the SoC 100 may control the operations of the non-volatile memory device 200 and the volatile memory device 300.

The SoC 100 may include a controller 110 that controls the overall operation of the SoC 100, a first interface 112 that performs interfacing with the volatile memory device 300, and a second interface 114 that performs interfacing with the non-volatile memory device 200.

In some example embodiments, the protocols applied to the first interface 112 and the second interface 114 may be different. In some example embodiments, the first interface 112 and the second interface 114 may be implemented using various interface methods such as one or more of ATA (Advanced Technology Attachment), SATA (Serial ATA), e-SATA (external SATA), SCSI (Small Computer Small Interface), SAS (Serial Attached SCSI), PCI (Peripheral Component Interconnection), PCIe (PCI express), NVMe, IEEE 1394, USB (universal serial bus), SD (secure digital) card, MMC (multi-media card), eMMC, UFS, cUFS (embedded Universal Flash Storage), CF (compact flash) card interface, etc.

The non-volatile memory device 200 may store data necessary for or used for the operation of the vehicle. In some example embodiments, the non-volatile memory device 200 may include a flash memory device. In some example embodiments, the non-volatile memory device 200 may include a NAND flash memory device. However, example embodiments are not limited to this, and the non-volatile memory device 200 may include various other types of non-volatile memory devices. For example, the non-volatile memory device 200 may include one or more of MRAM (Magnetic RAM), Spin-Transfer Torque MRAM, Conductive bridging RAM (CBRAM), FeRAM (Ferroelectric RAM), PRAM (Phase RAM), and Resistive RAM devices.

The volatile memory device 300 may store data necessary for or used for the operation of the vehicle. In some example embodiments, the volatile memory device 300 may include DRAM (Dynamic Random Access Memory). For example, the volatile memory device 300 may include one or more of DDR SDRAM (Double Data Rate Synchronous DRAM), HBM (High Bandwidth Memory), HMC (Hybrid Memory Cube), DIMM (Dual In-line Memory Module), etc. In some example embodiments, the volatile memory device 300 may also (or alternatively) include SRAM.

The volatile memory device 300 may include control logic 310, a command timer 314, a time-setting register 316, and a self-refresh timer 318.

The control logic 310 may control the operation of the volatile memory device 300. The control logic 310 may wake up the volatile memory device 300 or may put into a sleep mode. In some example embodiments, the control logic 310 may power on or power off volatile memory device 300.

The time setting register 316 may store a first threshold time. In this embodiment, the first threshold time represents a maximum time for the volatile memory device 300 to perform the self-refresh operation to reduce power consumption due to the self-refresh operation of the volatile memory device 300 while the vehicle is powered off. After the first threshold time has elapsed, the volatile memory device 300 may perform the necessary operation for powering off. A more specific description of this will be described later.

The self-refresh timer 318 may monitor whether the performance time of the self-refresh operation of the volatile memory device 300 has elapsed the first threshold time based on the first threshold time in the time setting register 316. Additionally or alternatively, if the performance time of the self-refresh operation of the volatile memory device 300 has elapsed the first threshold time, the self-refresh timer 318 may transmit a control signal to the control logic 310.

The command timer 314 may monitor a read command provided from the SoC 100 to the control logic 310. Additionally or alternatively, if the read command is not received from the SoC 100 for a second threshold time, the command timer 314 may transmit a control signal to the control logic 310.

In various example embodiments, the second threshold time may be a time to confirm that all data stored in the volatile memory device 300 has been transferred to the non-volatile memory device 200. When the data stored in the volatile memory device 300 is transferred to the non-volatile memory device 200, the SoC 100 may provide read commands to the volatile memory device 300 multiple times to transfer the data stored in the volatile memory device 300 to the non-volatile memory device 200. Once all data stored in the volatile memory device 300 has been transferred to the non-volatile memory device 200, the SoC 100 may no longer provide read commands to the volatile memory device 300. Therefore, if no more read commands are received from the SoC 100 until the second threshold time has elapsed, it may be determined that all the data stored in the volatile memory device 300 has been transferred to the non-volatile memory device 200.

Afterwards, the control logic 310 may power off the volatile memory device 300. Alternatively, the SoC 100 may power off the volatile memory device 300.

In some example embodiments, the first threshold time used to reduce current consumption caused by the self-refresh operation of the volatile memory device 300 while the vehicle is powered off, and the second threshold time used to confirm that all data stored in the volatile memory device 300 has been transferred to the non-volatile memory device 200, may be the same or different. In some example embodiments, the second threshold time may be shorter than the first threshold time, but embodiments are not limited thereto.

In some example embodiments, the command timer 314, the time setting register 316, and the self-refresh timer 318 may be implemented as separate hardware that is distinct from the control logic 310. Additionally or alternatively, in some example embodiments, at least some of the command timer 314, time setting register 316, and self-refresh timer 318 may be implemented as components included in the control logic 310.

Figure 4:
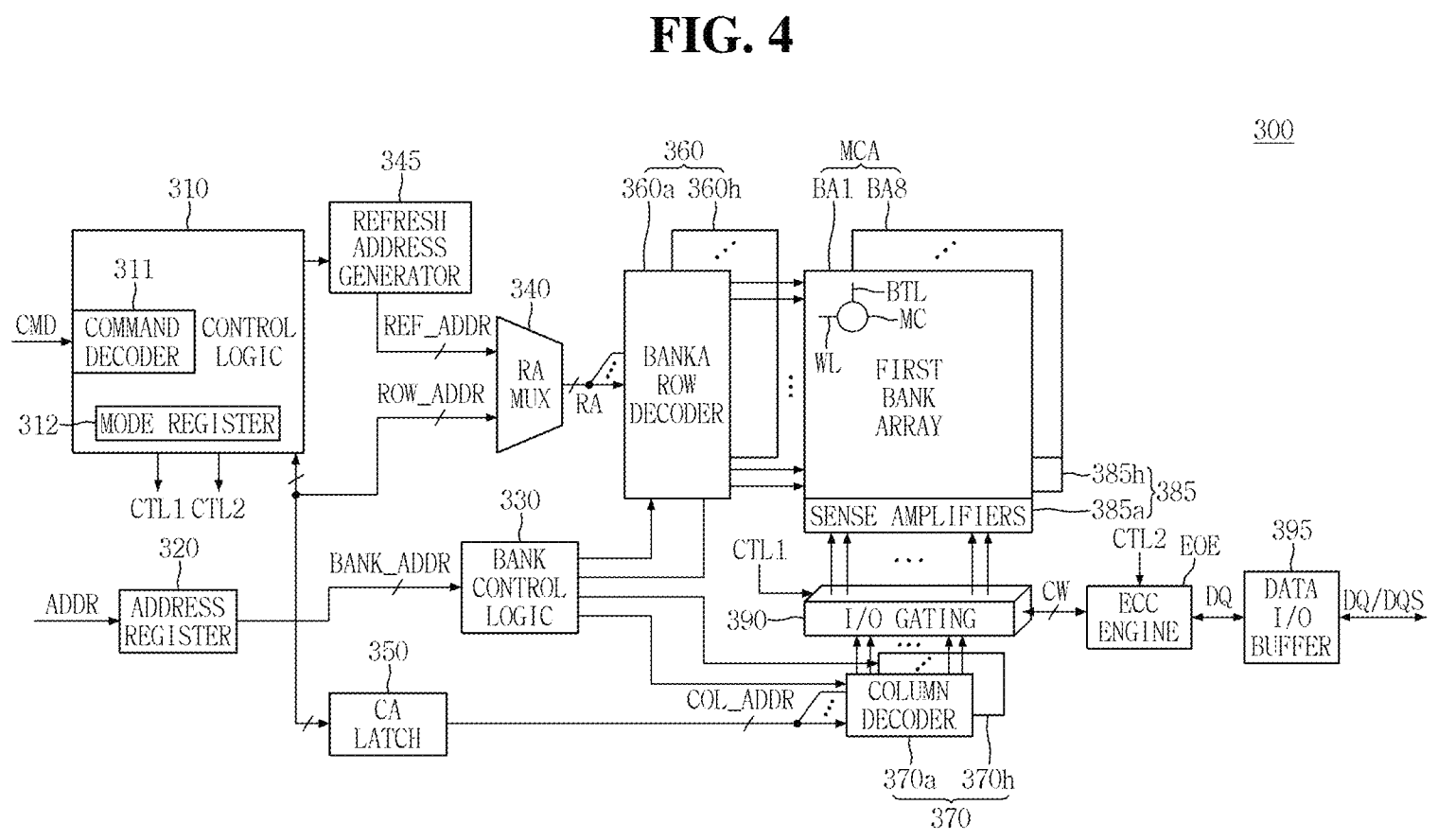

FIG. 4 is a diagram illustrating the volatile memory device of FIG. 3.

Referring to FIG. 4, the volatile memory device 300 may include control logic 310, an address register 320, bank control logic 330, a row address multiplexer 340, a refresh address generator 345, a column address latch 350, a row decoder 360, a column decoder 370, a sense amplifier 385, an input/output gating circuit 390, a memory cell array MCA, an ECC engine EOE, and a data input/output buffer 395.

The memory cell array MCA may include a plurality of memory cells MC for storing data therein. For example, the memory cell array MCA may include first to eighth bank arrays BA1 to BA8. Each of the first to eighth bank arrays BA1 to BA8 may include a plurality of word-lines WL, a plurality of bit-lines BTL, and a plurality of memory cells MC respectively disposed in intersections of the word-lines WL and bit-lines BTL.

The memory cell array MCA may include the first to eighth bank arrays BA1 to BA8. Although FIG. 4 illustrates the volatile memory device 300 including the eight bank arrays BA1 to BA8, embodiments are not limited thereto, and the volatile memory device 300 may include any number of bank arrays.

The control logic 310 may control an operation of the volatile memory device 300. For example, the control logic 310 may generate control signals CTL1 and CTL2 so that the volatile memory device 300 performs an operation for writing data or an operation for reading data. The control logic 310 may include a command decoder 311 for decoding a command CMD received from the SoC 100, and a mode register 312 for setting an operation mode of the volatile memory device 300.

For example, the command decoder 311 may generate control signals corresponding to the command CMD by decoding one or more of a write enable signal, a row address strobe signal, a column address strobe signal, and a chip select signal. The control logic 310 may receive a clock signal and a clock enable signal for driving the volatile memory device 300 in a synchronous manner.

Additionally or alternatively, the control logic 310 may control the refresh address generator 345 to generate a refresh row address REF_ADDR in response to a refresh command.

The address register 320 may receive an address ADDR from the SoC 100. For example, the address register 320 may receive the address ADDR including a bank address BANK_ADDR, a row address ROW_ADDR, and a column address COL_ADDR. The address register 320 may provide the received bank address BANK_ADDR to the bank control logic 330, the received row address ROW_ADDR to the row address multiplexer 340, and the received column address COL_ADDR to the column address latch 350.

The bank control logic 330 may generate bank control signals in response to the bank address BANK_ADDR received from the address register 320. In response to these bank control signals, a bank row decoder corresponding to the bank address BANK_ADDR among the first to eighth bank row decoders 360a to 360h may be activated, and a bank column decoder corresponding to the bank address BANK_ADDR among the first to eighth bank column decoders 370a to 370h may be activated.

The row address multiplexer 340 may receive a row address ROW_ADDR from the address register 320, and a refresh row address REF_ADDR from the refresh address generator 345. The row address multiplexer 340 may selectively output the row address ROW_ADDR received from the address register 320 or the refresh row address REF_ADDR received from the refresh address generator 345 as a row address RA. The row address RA output from the row address multiplexer 340 may be applied to the first to eighth bank row decoders 360a to 360h, respectively.

The refresh address generator 345 may generate the refresh row address REF_ADDR to refresh the memory cells. The refresh address generator 345 may provide the refresh row address REF_ADDR to the row address multiplexer 340. Accordingly, the memory cells disposed in the word-line corresponding to the refresh row address REF_ADDR may be refreshed.

The column address latch 350 may receive the column address COL_ADDR from the address register 320, and may temporarily store therein the received column address COL_ADDR. Further, the column address latch 350 may incrementally increase the received column address COL_ADDR in a burst mode. The column address latch 350 may apply the temporarily-stored or incrementally-increased column address COL_ADDR to each of the first to eighth bank column decoders 370a to 370h.

The row decoder 360 may include first to eighth bank row decoders 360a to 360h respectively connected to the first to eighth bank arrays BA1 to BA8. The column decoder 370 may include first to eighth bank column decoders 370a to 370h respectively connected to the first to eighth bank arrays BA1 to BA8. The sense amplifier 385 may include first to eighth bank sense amplifiers 385a to 385h respectively connected to the first to eighth bank arrays BA1 to BA8.

The bank row decoder activated by the bank control logic 330 among the first to eighth bank row decoders 360a to 360h may decode the row address RA output from the row address multiplexer 340 to activate a word-line corresponding to the row address RA. For example, the activated bank row decoder may apply a word-line driving voltage to a word-line corresponding to the row address RA.

The bank column decoder activated by the bank control logic 330 among the first to eighth bank column decoders 370a to 370h may activate the bank sense amplifiers 385a to 385h corresponding to the bank address BANK_ADDR and the column address COL_ADDR via the input/output gating circuit 390.

The input/output gating circuit 390 may include circuits for gating input/output data, an input data mask logic, read data latches for storing therein data output from the first to eighth bank arrays BA1 to BA8, and write drivers for writing data into the first to eighth bank arrays BA1 to BA8.

A codeword CW to be read from one bank array among the first to eighth bank arrays BA1 to BA8 may be sensed by the bank sense amplifiers 385a to 385h corresponding to the one bank array and may be stored in the read data latches.

The ECC engine EOE may perform ECC decoding on the codeword CW stored in the read data latches. When an error is detected in data of the codeword CW, the ECC engine EOE may provide a corrected data signal DQ to an external memory controller via the data input/output buffer 395.

A data signal DQ to be written to one bank array among the first to eighth bank arrays BA1 to BA8 may be provided to the ECC engine EOE. The ECC engine EOE may generate parity bits based on the data signal DQ, and may provide the data signal DQ and the parity bits to the input/output gating circuit 390. The input/output gating circuit 390 may write the data signal DQ and the parity bits to a sub-page of the one bank array via the write drivers.

The data input/output buffer 395 may receive the data signal DQ and a data strobe signal DQS from an external device (e.g., the SoC 100)). In some example embodiments, the data input/output buffer 395 may include a first data input/output buffer (e.g., a data buffer) that receives the data signal DQ from the external device (e.g., SoC 100), and a second data input/output buffer (e.g., a data strobe buffer) that receives the data strobe signal DQS from the external device (e.g., SoC 100).

In a write operation, the data input/output buffer 395 may perform buffering or driving on the data signal DQ (for example, write data) and may provide the data signal DQ to the ECC engine EOE. In a read operation, the data input/output buffer 395 may perform buffering or driving on the data signal DQ (for example, read data) provided from the ECC engine EOE and may provide the data signal DQ to the external device (e.g., SoC 100).

Figure 5A:
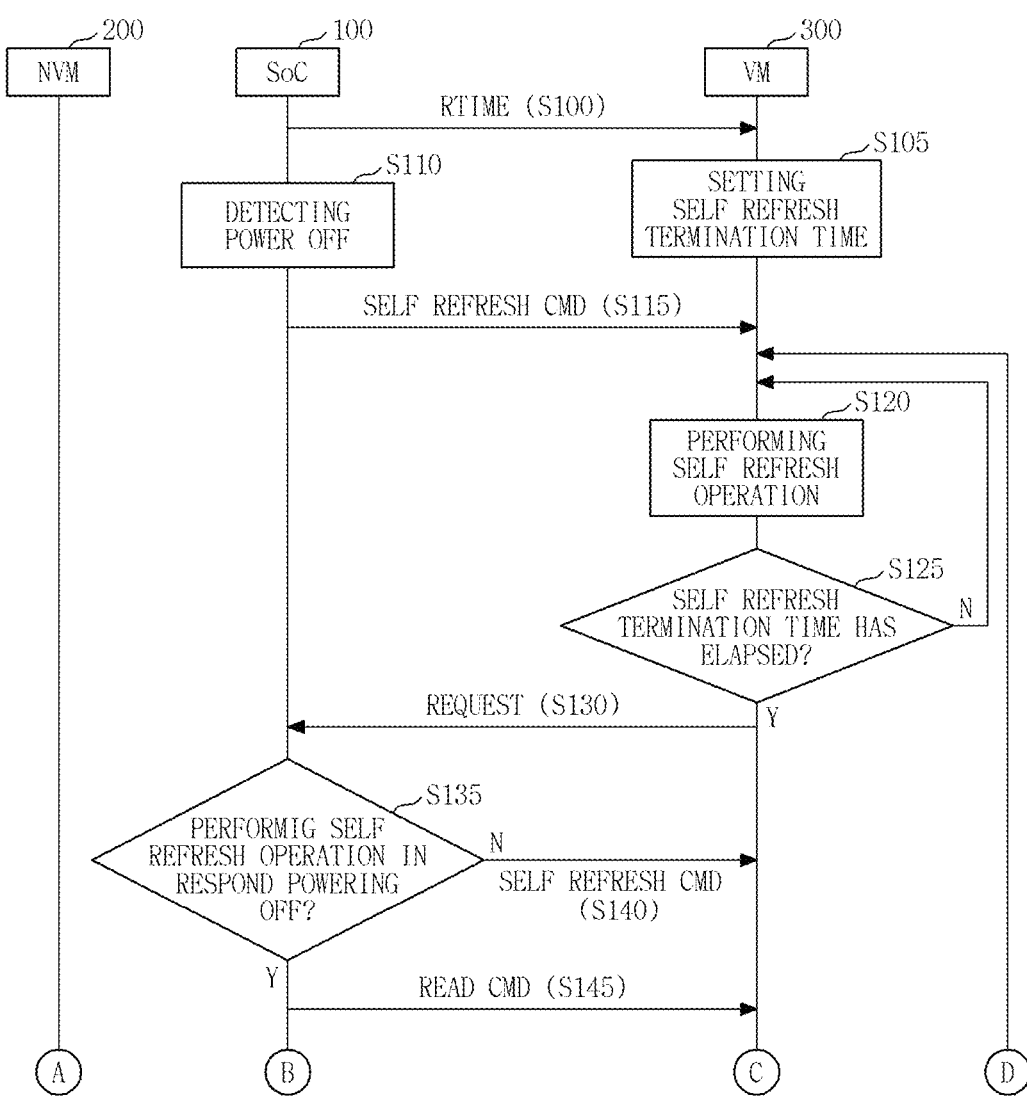
FIGS. 5A and 5B are diagrams illustrating a power off operation of an electronic device according to some example embodiments.
Figure 5B:
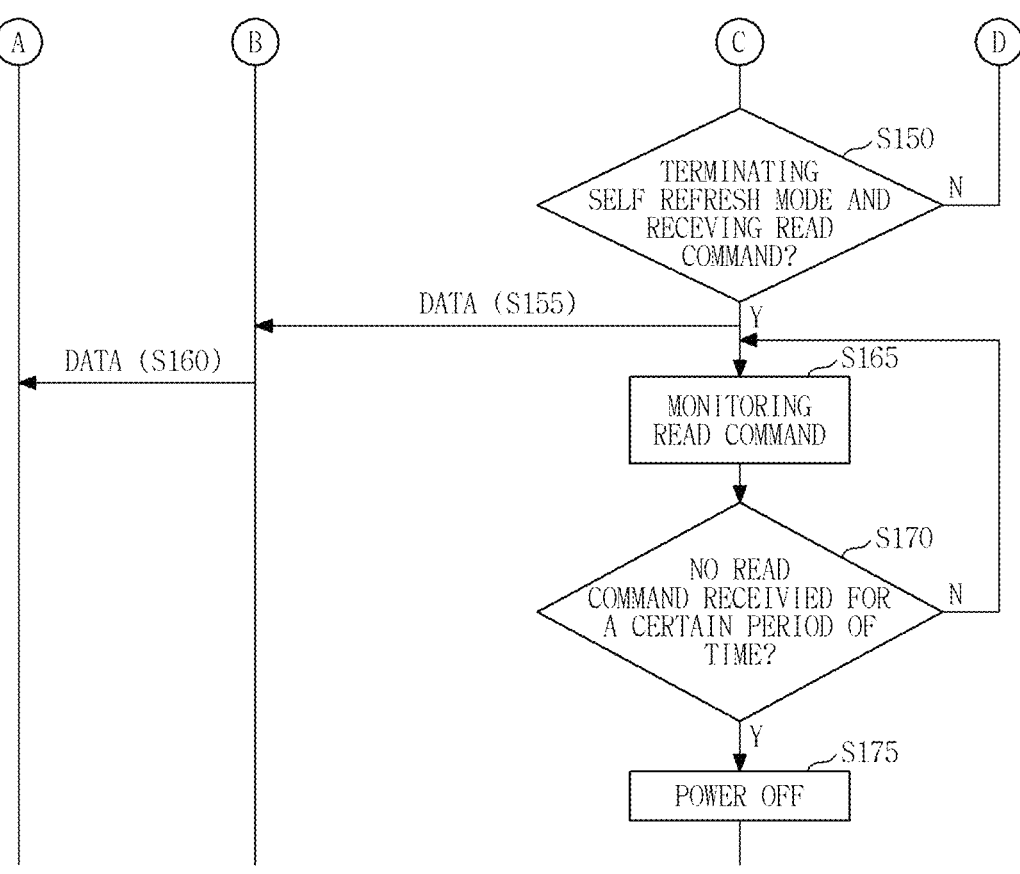
Figure 6:
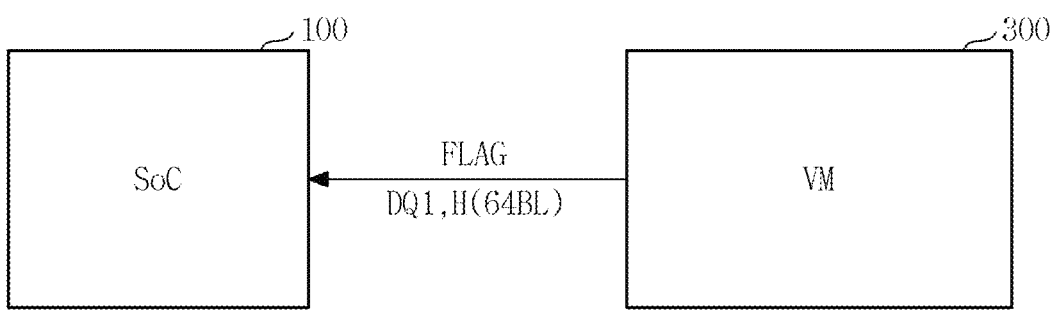
FIGS. 6 and 7 are diagrams for explaining the operations of FIGS. 5A and 5B.
Figure 7:
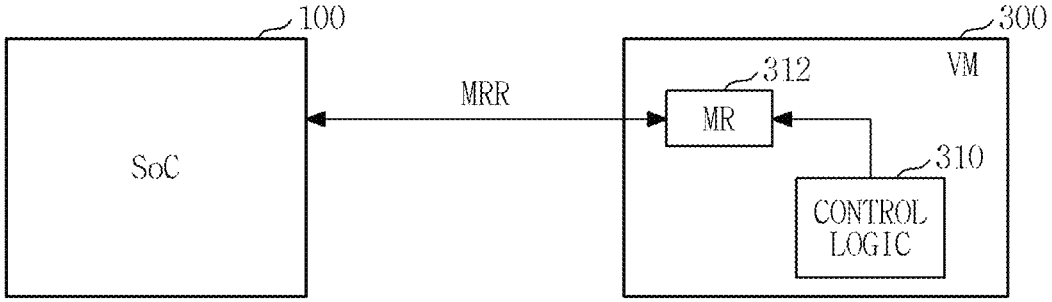

FIGS. 5A and 5B are diagrams illustrating a power off operation of an electronic device according to some example embodiments. FIGS. 6 and 7 are diagrams for explaining the operations of FIGS. 5A and 5B.

Referring to FIG. 5A, when the volatile memory device 300 is initialized, the SoC 100 provides a first threshold time RTIME to the volatile memory device 300 (S100).

In this embodiment, the first threshold time RTIME is the maximum time that the volatile memory device 300 performs the self-refresh operation to reduce the power consumption caused by the self-refresh operation of the volatile memory device 300 while the vehicle is powered off.

The first threshold time RTIME may be set to a sufficiently long time so that it is not applied to the transient self-refresh operation of the volatile memory device 300 while the vehicle is not powered off.

For example, if the first threshold time RTIME is set too short, the volatile memory device 300 may unnecessarily need to perform a power-off preparation operation that will be described later. Accordingly, in various example embodiment, the first threshold time RTIME may be set sufficiently long to prevent or reduce the likelihood of and/or impact from unnecessary subsequent operations.

The volatile memory device 300 that has provided the first threshold time RTIME may set the first threshold time RTIME as a self-refresh termination time (S105).

For example, referring to FIG. 3, the control logic 310 of the volatile memory device 300 may store the first threshold time RTIME provided from the SoC 100 in the time setting register 316.

Next, when the vehicle is powered off, the SoC 100 detects that the vehicle is powered off (S110). Even if the vehicle is powered off, it is necessary or desirable to maintain the data stored in the volatile memory device 300 as the data may be reused shortly. Accordingly, the SoC 100 provides a command to instruct the volatile memory device 300 to perform a self-refresh operation (S115). In some example embodiments, thereafter, the SoC 100 may continue to maintain self-refresh related control signals to the volatile memory device 300 so that the volatile memory device 300 maintains in self-refresh mode continuously.

The volatile memory device 300, which receives a command instructing the self-refresh operation from the SoC 100, performs the self-refresh operation (S120). In accordance with performing such a self-refresh operation, the volatile memory device 300 may consume operating current (e.g., IDD6).

Then, the method includes checking whether the performance time of the self-refresh operation of the volatile memory device 300 has elapsed the first threshold time RTIME, which is the self-refresh termination time (S125).

If the performance time of the self-refresh operation has not elapsed the first threshold time RTIME, which is the self-refresh termination time (S125—N), the self-refresh operation continues to be performed (S120). However, if the performance time of the self-refresh operation has elapsed the first threshold time RTIME, which is the self-refresh termination time (S125—Y), the volatile memory device 300 requests the SoC 100 to transfer the data stored in the volatile memory device 300 (S130).

For example, referring to FIG. 3, the self-refresh timer 318 may monitor whether the performance time of the self-refresh operation of the volatile memory device 300 has elapsed the first threshold time (RTIME) based on the first threshold time (RTIME) of the time setting register 316. And, if the performance time of the self-refresh operation of the volatile memory device 300 has elapsed the first threshold time (RTIME), the self-refresh timer 318 may transmit a control signal to the control logic 310.

The control logic 310, which receives the control signal from the self-refresh timer 318, may transmit a request to the SoC 100 to transfer the data stored in the volatile memory device 300.

Referring to FIGS. 3 and 6, in some example embodiments, the control logic 310 may switch the volatile memory device 300 to an active mode to transmit a request to the SoC 100 to transfer the data stored in the volatile memory device 300. Additionally, the control logic 310 may transmit a flag signal (FLAG) to the SoC 100 to request the SoC 100 to transfer the data stored in the volatile memory device 300.

For instance, the control logic 310 may transmit a flag signal (FLAG) to the SoC 100 requesting the transfer of data stored in the volatile memory device 300 by maintaining one or more data port signal sent to the SoC 100. For example, the control logic 310 may transmit a flag signal (FLAG) to the SoC 100 requesting the transfer of data stored in the volatile memory device 300 by maintaining a DQ1 port signal sent to the SoC 100 at H (logic high) for a 64BL (Burst Length).

Referring to FIGS. 3 and 7, in some example embodiments, the control logic 310 may store information in the mode register 312 of the volatile memory device 300 indicating that the performance time of the self-refresh operation has elapsed the first threshold time, in order to transmit a request to transfer the data stored in the volatile memory device 300 to the SoC 100. Subsequently, the SoC 100 may receive the transfer request for the data stored in the volatile memory device 300 by confirming the information stored in the mode register 312, for example, using an MRR command.

Referring to FIG. 5A, the SoC 100, which has received a request to transfer data stored in the volatile memory device 300, determines whether the volatile memory device 300 has performed a self-refresh operation in response to the vehicle being powered off (S135).

If the SoC determines that the volatile memory device 300 has not performed the self-refresh operation in response to the vehicle being powered off (S135—N), the SoC 100 transmits a command to instruct the volatile memory device 300 to perform the self-refresh operation (S140). Alternatively, the SoC 100 continues to maintain the self-refresh related control signal to the volatile memory device 300 without alteration.

If the SoC determines that the volatile memory device 300 has performed a self-refresh operation in response to the vehicle being powered off (S135—Y), the SoC 100 transmits a read command to the volatile memory device 300 to transfer the data stored in the volatile memory device 300 to the non-volatile memory device 200 (S145).

It may take a lot of time and/or a lot of resources to transfer the data stored in the volatile memory device 300 to the non-volatile memory device 200 and then transfer the data stored in the non-volatile memory device 200 to the volatile memory device 300. Sometimes, the volatile memory device 300 may perform a self-refresh operation as needed or intended even when the vehicle is not powered off, in which case the self-refresh operation mode of the volatile memory device 300 may be resolved in a relatively short period of time. Therefore, even in this case, transferring data stored in the volatile memory device 300 to the non-volatile memory device 200 and then transferring data stored in the non-volatile memory device 200 to the volatile memory device 300 may result in unnecessary waste of resources. Hence, in various example embodiments, the volatile memory device 300 performs a self-refresh operation in response to the vehicle being powered off, and transfers the data stored in the volatile memory device 300 to the non-volatile memory device 200 when the first threshold time has elapsed. This may reduce the use of unnecessary resources.

Next, the volatile memory device 300 determines whether it has received a notification of the self-refresh operation termination and a read command from the SoC 100 (S150). In some example embodiments, the notification of the self-refresh operation termination from the SoC 100 may be, for example, a change in a self-refresh related control signal transmitted from the SoC 100.

If the notification of the self-refresh operation termination and the read command are received from the SoC 100 (S150—Y), the volatile memory device 300 transmits the data corresponding to the read command to the SoC 100 (S155). Then, the SoC 100 stores the data received from the volatile memory device 300 in the non-volatile memory device 200 (S160).

If the notification of the self-refresh operation termination is not received from the SoC 100 (S150—N), the volatile memory device 300 continues to perform the self-refresh operation.

Next, the volatile memory device 300 monitors the read command received from the SoC 100 (S165). If no read command is received from the SoC 100 for a certain period of time (S170—Y), the volatile memory device 300 is powered off (S175). And, if the certain period of time has not elapsed (S170—N), the read command is continuously monitored (S165)

Referring to FIG. 3, to transfer the data stored in the volatile memory device 300 to the non-volatile memory device 200, the SoC 100 may transmit a plurality of read commands to the volatile memory device 300.

In some example embodiments, the command timer 314 may monitor a read command provided to the control logic 310 from the SoC 100. And, if the read command is not received from the SoC 100 for a second threshold time, the command timer 314 may transmit a control signal to the control logic 310.

In some example embodiments, the second threshold time may be the time to confirm that all the data stored in the volatile memory device 300 has been transferred to the non-volatile memory device 200. If all the data stored in the volatile memory device 300 has been transferred to the non-volatile memory device 200, the SoC 100 will no longer provide read commands to the volatile memory device 300. Therefore, if no more read commands are received from the SoC 100 until the second threshold time has elapsed, it may be determined that all the data stored in the volatile memory device 300 has been transferred to the non-volatile memory device 200. In some examples, the volatile memory device 300 according to various example embodiments may be equipped with a command timer 314, which may improve the reliability of the operation of transferring data stored in the volatile memory device 300 to the non-volatile memory device 200.

The control logic 310 that receives the control signal from the command timer 314 may power off the volatile memory device 300. Alternatively or additionally, in some example embodiments, the SoC 100 may power off the volatile memory device 300.

Thus, when the vehicle is powered off, all the data stored in the volatile memory device 300 has been reliably transferred to the non-volatile memory device 200, and then the volatile memory device 300 is also powered off, so that thereby the operation power of the electronic device 1 may be reduced.

Figure 8:
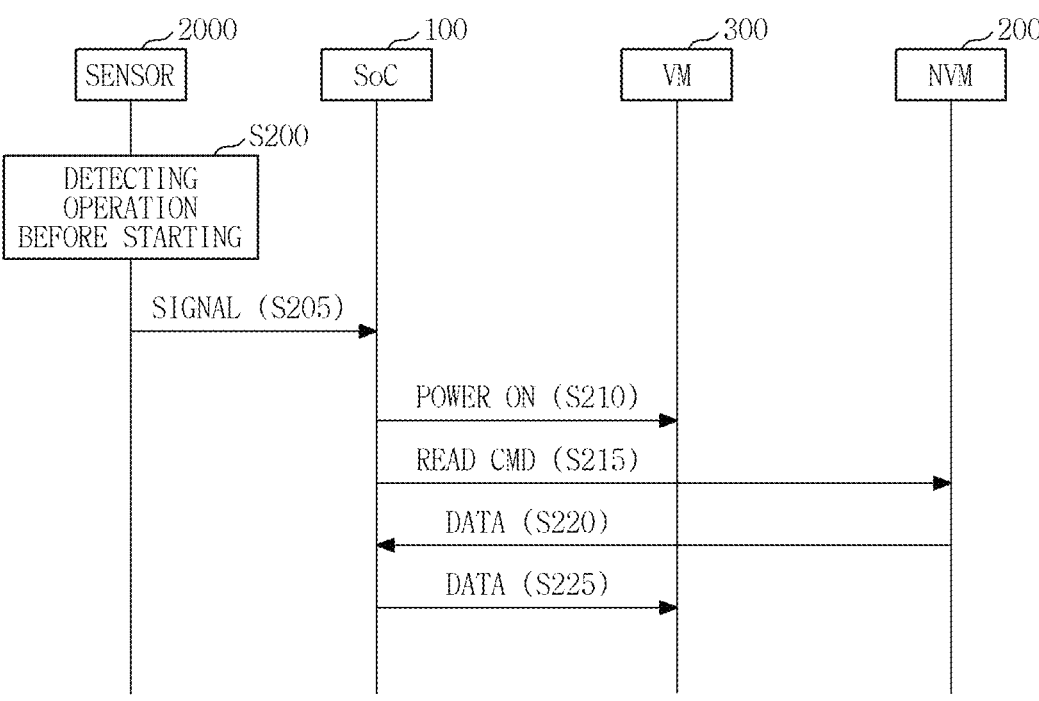
FIG. 8 is a diagram illustrating a power on operation of an electronic device according to some example embodiments.

FIG. 8 is a diagram illustrating a power on operation of an electronic device according to some example embodiments.

Referring to FIG. 8, the sensor 2000 may detect the operation of the vehicle before starting (S200). And, when the operation of the vehicle before starting is detected, the sensor 2000 transmits a control signal to the SoC 100 (S205).

Referring to FIGS. 1 and 2, for example, the sensor 2000 may detect movements such as the opening or closing of the door 4000 and transmit a control signal to the SoC 100. Additionally or alternatively, the sensor 2000 may detect such movement when a person sits on the seat 3000 and transmit a control signal to the SoC 100. Additionally or alternatively, the sensor 2000 may detect such movement when a person pulls on the seat belt 3100 and transmit a control signal to the SoC 100. Additionally or alternatively, the sensor 2000 may detect movement when a person fastens the seat belt 3100 to the safety buckle and transmit a control signal to the SoC 100.

The SoC 100, which receives these control signals from the sensor 2000, may recognize that the power-on of the vehicle is imminent and perform an operation necessary to power on the vehicle.

The SoC 100 powers on the volatile memory device 300 that was powered off (S210). Then, the SoC 100 transmits a read command to the non-volatile memory device 200 and receives the data transferred from the volatile memory device 300 to the non-volatile memory device 200 (S220). Subsequently, the SoC 100 stores the data received from the non-volatile memory device 200 in the volatile memory device 300 (S225). Accordingly, the data transferred to the non-volatile memory device 200 before the volatile memory device 300 is powered off may be restored back to the volatile memory device 300.

In various example embodiments, the operation in which data transferred to the non-volatile memory device 200 is restored back to the volatile memory device 300 may begin even before the actual vehicle is powered on. Accordingly, one or more users may not notice the latency caused by the data transfer, which may improve the operation performance of the electronic device 1.

Figure 9:
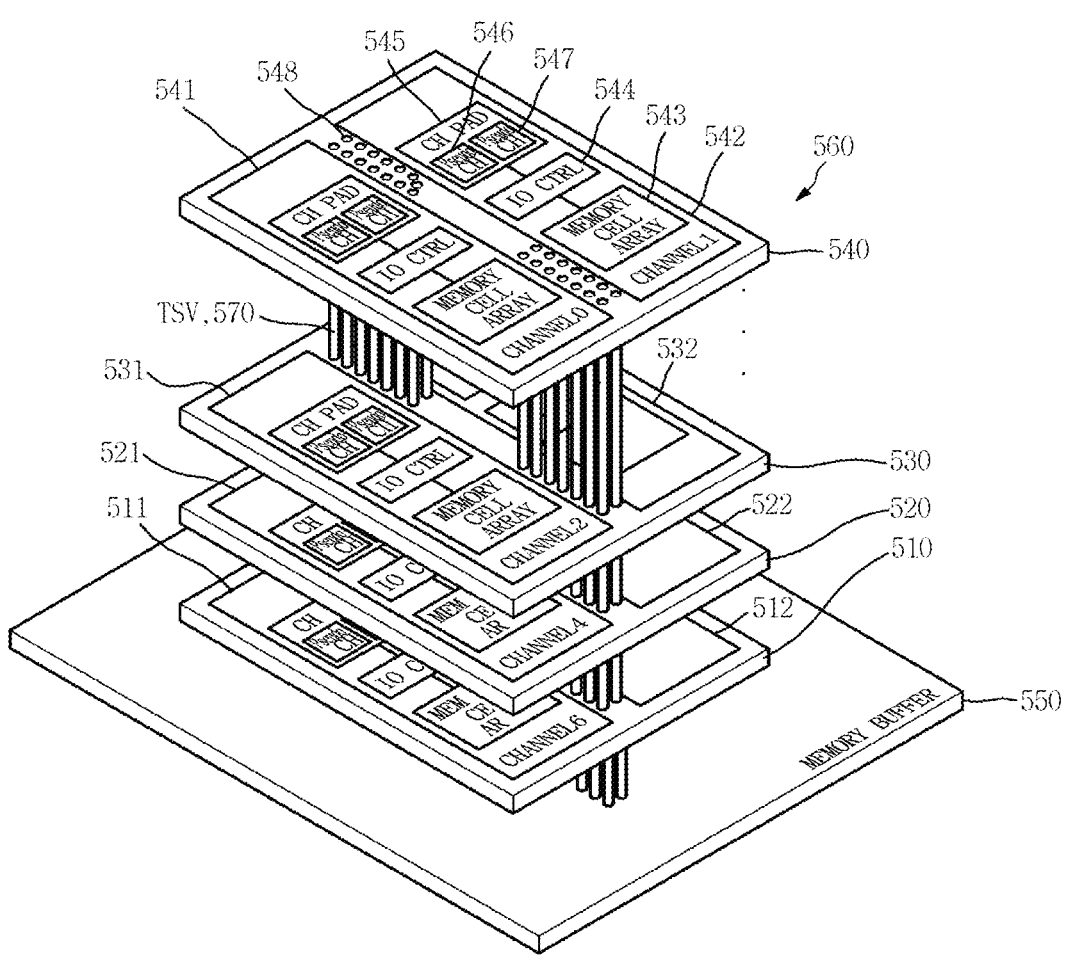
FIG. 9 is a diagram for explaining a volatile memory device according to some example embodiments.

FIG. 9 is a diagram for explaining a volatile memory device according to some example embodiments. FIG. 9 is a diagram illustrating an embodiment of the volatile memory device 300 of FIG. 3 described above.

Referring to FIG. 9, a memory device 560 may include a stack of a plurality of memory layers 510, 520, 530, and 540. The memory device 560 may be embodied as, for example, HBM (High Bandwidth Memory). The memory layers 510, 520, 530, and 540 may constitute a plurality of independent interfaces referred to as channels.

Each of the memory layers 510, 520, 530, and 540 may include two channels 511-512, 521-522, 531-532, or 541-542. FIG. 9 shows an example in which the memory device 560 includes a stack of four memory layers 510, 520, 530, and 540 to constitute (or are included in) 8 channels. However, example embodiments are not limited thereto. According to various embodiments, the memory device 560 may have a stack of 2 to 8, or more than 8, memory layers. The memory layers 510, 520, 530, and 540 may have the same or different electrical and/or physical properties; example embodiments are not limited thereto.

Each of the channels 511, 512, 521, 522, 531, 532, 541, and 542 may include a memory cell array 543 that operates independently on each channel basis, an input/output controller 544 for independently controlling the memory cell array 543 on each channel basis, and a channel pad 545 that provides a channel for the memory cell array 543.

The memory cell array 543 may include memory cells connected to a plurality of word-lines and a plurality of bit-lines. The memory cells may be grouped into a plurality of memory banks and/or memory blocks. In an area of the memory cell array 543, one or more of a row decoder, a column decoder, a sense amplifier, etc. for accessing the memory cells may be disposed.

The input/output control 544 may include a RAS control logic, a CAS control logic, etc. The channel pad 545 may include pads arranged in a matrix manner including a plurality of rows and a plurality of columns. Each of the pads of the channel pad 545 may be connected to an electrode 548 and a through silicon via (TSV) 570 using a wiring for signal routing.

The memory device 560 may further include a memory buffer 550 disposed under the stack of the memory layers 510, 520, 530, and 540. The memory buffer 550 may include an input buffer (or receiver) that receives a command, an address, a clock and data from the control logic, and may buffer and provide the received command, address, clock and data to the channels 511, 512, 521, 522, 531, 532, 541, and 542.

The memory buffer 550 may include the data receiving device (RX in FIG. 1) as described above. The memory buffer 550 may perform signal distribution functions and data input/output functions on the channels 511, 512, 821, 522, 531, 532, 541, and 542 using the electrodes 548 and through silicon vias 570.

The memory buffer 550 may communicate with the control logic through conducting buses or mechanisms, such as bumps or solder balls, formed on an outer face of the memory device 560.

Each of the memory layers 510, 520, 530, and 540 may include two channels 511, 512, 521, 522, 531, 532, 541, and 542. A single channel may be composed of two pseudo-channels.

Assuming that the number of data input/output (DQ) pads included in an area of the channel pad 545 of each of the channels 511, 512, 521, 522, 531, 532, 541, and 542 is, for example, 128, the 128 DQ pads of the channel pad 545 of each of the channels 511, 512, 521, 522, 531, 532, 541, and 542 may be divided into two groups of pseudo-channels 546, 547, and the number of DQ pads of each of the pseudo channels 546 and 547 may be 64. In this regard, each of the channels 511, 512, 521, 522, 531, 532, 541, and 542 may receive the data via eight DQ pads.

Figure 10:
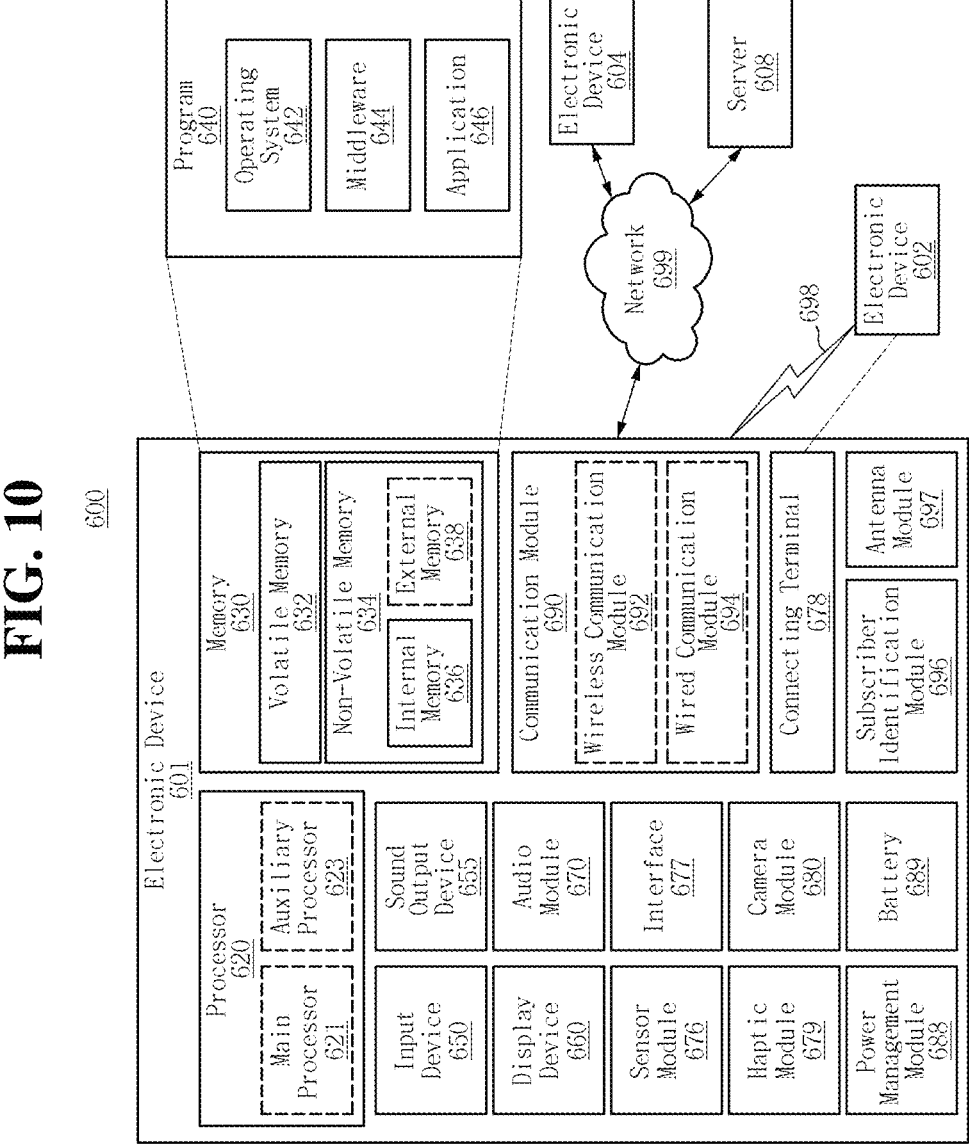
FIG. 10 is a block diagram of an electronic device according to some example embodiments.

FIG. 10 is a block diagram of an electronic device according to some example embodiments. FIG. 10 is a diagram illustrating an embodiment of the previously described electronic device 1.

Referring to FIG. 10, an electronic device 601 in a network environment 600 may communicate with an electronic device 602 for example, through a first network 698 such as a short-range wireless network, or may communicate with an electronic device 604 or a server 608, for example, through a second network 699 such as a long-range wireless network. In some example embodiments, although such electronic device 601 may be, for example, a notebook computer, a laptop computer, a portable mobile terminal, and the like, the embodiments are not limited thereto.

The electronic device 601 may communicate with the electronic device 604 through the server 608. The electronic device 601 may include a processor 620, a memory 630, an input device 650, a sound output device 655, an image display device 660, an audio module 670, a sensor module 676, an interface 677, a haptic module 679, a camera module 680, a power management module 688, a battery 689, a communication module 690, a subscriber identification module (SIM) 696, or an antenna module 697, and the like.

In some example embodiments, for example, at least one of the components, such as the display device 660 or the camera module 680, may be omitted from the electronic device 601, or one or more other components may be added to the electronic device.

In some example embodiments, some of the components may be implemented as a single integrated circuit (IC). For example, the sensor module 676, such as a fingerprint sensor, an iris sensor, or a luminance sensor, may be buried in an image display device, such as a display.

The processor 620 may execute software (e.g., program 640) for controlling other components of at least one electronic device 601 such as hardware or software component connected to the processor 620, thereby performing various date processing and computations.

As at least part of the data processing or computations, the processor 620 may load command or data received from other components such as the sensor module 676 or the communication module 690 to a volatile memory 632, process the command or data stored in the volatile memory 632, and store the resultant data in the non-volatile memory 634.

The processor 620 may include, for example, a main processor 621 such as a central processing unit (CPU) or an application processor (AP), and an auxiliary processor 623 that operates independently of or together with the main processor 621.

Such an auxiliary processor 623 may include, for example, a graphic processing unit (GPU), an image signal processor (ISP), a sensor hub processor, or a communication processor (CP) or the like.

In some example embodiments, the auxiliary processor 623 may be configured to consume less power than the main processor 621 or perform specific functions. The auxiliary processor 623 may be implemented separately from or as a part of the main processor 621.

The auxiliary processor 623 may control at least some of the functions or statuses associated with at least one component among the components of the electronic device 601, for example, on behalf of the main processor 621 while the main processor 621 is in an inactive status, or along with the main processor 621 while the main processor 621 is in an active status. In some example embodiments, the first core cluster (110 of FIG. 1) described above may perform the role of the main processor 621, and the second core cluster (120 of FIG. 1) may perform the role of the auxiliary processor 623.

The memory 630 may store various types of data used in at least one component of the electronic device 601. Various types of data may include, for example, input data and/or output data for software such as program 640, and commands associated with this. The memory 630 may include the volatile memory 632 and the non-volatile memory 634. The non-volatile memory 634 may include an internal memory 636 and an external memory 638.

In some example embodiments, the non-volatile memory 634 may correspond to the non-volatile memory device described above (200 of FIG. 3), and the volatile memory 632 may correspond to the volatile memory device described above (300 of FIG. 3).

The program 640 may be stored as software in the memory 630, and may include, for example, an operating system (OS) 642, a middleware 644, or an application 646.

The input device 650 may receive commands or data to be used in other components of the electronic device 601 from the outside of the electronic device 601. The input device 650 may include, for example, one or more of a microphone, a mouse or a keyboard.

The sound output device 655 may output a sound signal to the outside of the electronic device 601. The sound output device 655 may include, for example, a speaker. Multimedia data may be output through the speaker.

The image display device 660 may visually provide information to the outside of the electronic device 601. The image display device may include, for example, a display, a hologram device or a projector, and a control circuit for controlling the corresponding one among the display, the hologram device or the projector.

In some example embodiments, the image display device 660 may include a touch circuit configured to detect the touch, or a sensor circuit, for example, such as a pressure sensor configured to measure strength of force caused by the touch.

The audio module 670 may convert the sound into an electrical signal or vice versa. In some example embodiments, the audio module 670 may obtain the sound through the input device 650 or may output the sound through the sound output device 655 or a headphone of the external electronic device 602 that is directly and/or wirelessly connected to the electronic device.

The sensor module 676 may detect an operating status, such as power or temperature, of the electronic device 601 or an external environmental status, such as a user's status, and may generate an electrical signal or data value corresponding to the detected status. The sensor module 676 may include, for example, one or more of a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor or an illuminance sensor.

The interface 677 may support one or more specified protocols that are used by the electronic device 601 directly or wirelessly connected to the external electronic device 602. In some example embodiments, the interface 677 may include, for example, one or more of a high definition multimedia interface (HDMI), a universal serial bus (USB) interface, a secure digital (SD) card interface or an audio interface.

A connecting terminal 678 may include a connector through which the electronic device 601 may be physically connected to the external electronic device 602. In some example embodiments, the connecting terminal 678 may include, for example, an HDMI connector, a USB connector, an SD card connector or an audio connector (e.g., a headphone connector or the like).

The haptic module 679 may convert an electrical signal into a mechanical stimulus, for example, vibration or motion that may be perceived by the user through a tactile sensation or a kinesthetic sensation. In some example embodiments, the haptic module 679 may include, for example, one or more of a motor, a piezoelectric element or an electrical stimulator.

The camera module 680 may capture still images or moving images. In some example embodiments, the camera module 680 may include one or more lenses, an image sensor, an image signal processor, a flash, and the like.

The power management module 688 may manage the power to be supplied to the electronic device 601. The power management module may be implemented, for example, as at least a part of a power management integrated circuit (PMIC).

The battery 689 may supply power to at least one component of the electronic device 601. According to various example embodiments, the battery 689 may include, for example, a non-rechargeable primary battery, a rechargeable secondary battery or a fuel cell.

The communication module 690 may support establishment of direct communication channel or wireless communication channel between the electronic device 601 and an external electronic device, for example, such as the electronic device 602, the electronic device 604 or the server 608, and may perform communication through the established communication channel.

The communication module 690 may include one or more communication processors that is operable independently of the processor 620 and supports a direct communication or a wireless communication.

In some example embodiments, the communication module 690 may include a wireless communication module 692, for example, such as one or more of a cellular communication module, a short-range wireless communication module or a global navigation satellite system (GNSS) communication module, or a wired communication module 694, for example, such as a local area network (LAN) communication module or a power line communication module (PLC).

Among these communication modules, the corresponding communication module may communicate with the external electronic device through the first network 698, for example, such as one or more of a Bluetooth™, a Wi-Fi (wireless-fidelity) direct or an IrDA (standard of the Infrared Data Association) or the second network 699, for example, such as a cellular communication network, an Internet or a long-range communication network.

Various types of communication modules may be implemented as a single component or may be implemented as a plurality of components separated from each other. The wireless communication module 692 may verify and authenticate the electronic device 601 inside a communication network such as the first network 698 or the second network 699, for example, using subscriber information such as an international mobile subscriber identifier (IMSI) stored in the subscriber identification module 696.

The antenna module 697 may transmit or receive signals or power to and from the outside of the electronic device 601. In some example embodiments, the antenna module 697 may include one or more antennas, and hence, at least one antenna which is suitable for communication scheme used in communication networks such as the first network 698 or the second network 699 may be selected by the communication module 690. The signal or power may then be transmitted or received between the communication module and the external electronic device through at least one selected antenna.

At least some of the aforementioned components may be connected to each other to perform signal communication between them through an inter-peripheral communication scheme, for example, such as one or more of a general purpose input and output (GPIO), a serial peripheral interface (SPI) or a mobile industry processor interface (MIPI).

In some example embodiments, command or data may be transmitted or received between the electronic device 601 and the external electronic device 606 through the server 608 connected to the second network 699. Each of the electronic devices 602 and 606 may be devices which are the same type as or different type from of the electronic device 601. All or some of the operations to be executed in the electronic device 601 may be executed in one or more external electronic devices 602, 606 or 608. For example, all or some of the operations to be executed in the electronic device 601 may be performed in one or more external electronic devices 602, 606 or 608.

For example, if the electronic device 601 needs to perform the function or service automatically or in response to request from a user or other devices, the electronic device 601 that executes the function or service may require or may use one or more external electronic devices to perform at least some of the function or service on behalf of this or additionally. One or more external electronic devices that receive the request may perform at least some of the requested function or service or additional functions or additional services associated with the request, and send the results of the execution to the electronic device 601. The electronic device 601 provides the results as at least part of the response to the request, with or without accompanying further processing of the results. For example, cloud computing, distributed computing or client-server computing techniques may be used for this purpose.

Figure 11:
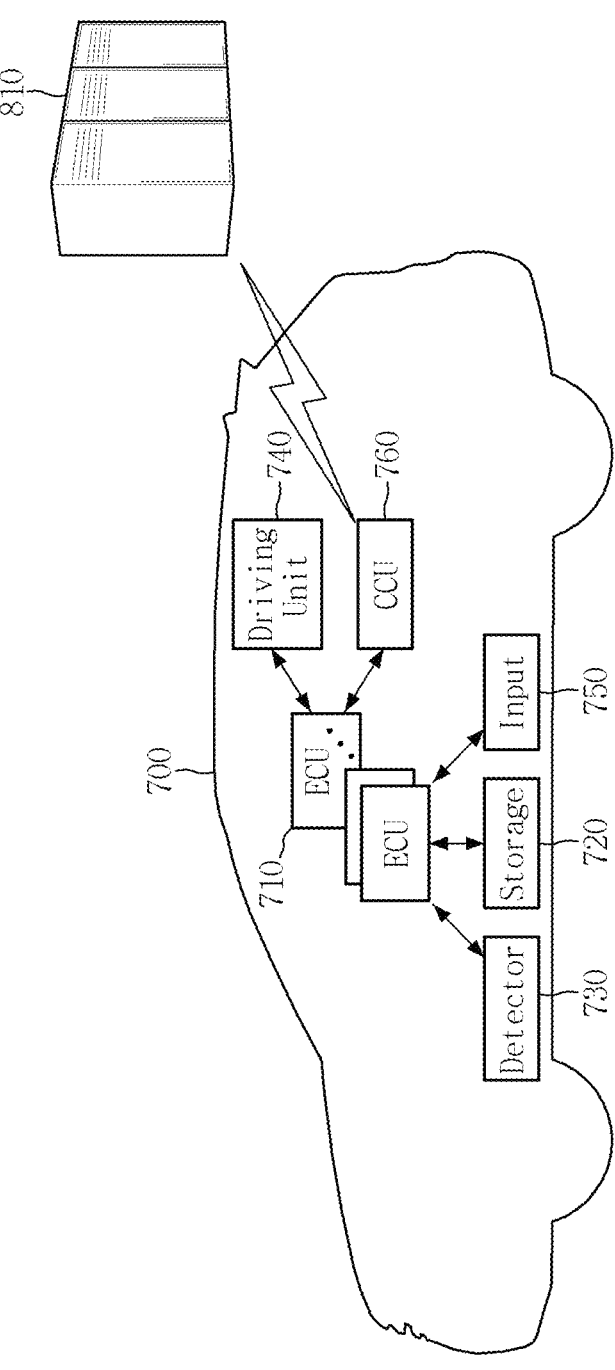
FIG. 11 is a diagram of a vehicle comprising an electronic device according to some example embodiments.

FIG. 11 is a diagram of a vehicle including an electronic device according to some example embodiments.

Referring to FIG. 11, a vehicle 700 may include plurality of electronic control units (ECU) 710, and a memory storage device 720.

In some example embodiments, the electronic control unit 710 may correspond to the ECU (1000 in FIG. 1) described above.

Each electronic control unit of the plurality of electronic control units 710 is electrically, mechanically, and communicatively connected to at least one of the plurality of devices provided in the vehicle 700, and may control the operation of at least one device on the basis of any one function execution command.

Here, the plurality of devices may include an acquiring device 730 that acquires an image necessary for performing at least one function, and a driving unit 740 that performs at least one function.

For example, the acquiring device 730 may include various detection units and image acquisition units, and the driving unit 740 may include a fan and compressor of an air conditioner, a fan of a ventilation device, an engine and a motor of a power device, a motor of a steering device, a motor and a valve of a brake device, an opening/closing device of a door or a tailgate, and the like.

The plurality of electronic control units 710 may communicate with the acquiring device 730 and the driving unit 740 using, for example, at least one of an Ethernet, a low voltage differential signaling (LVDS) communication, and a local interconnect network (LIN) communication.

The plurality of electronic control units 710 determine whether there is a need to perform the function on the basis of the information acquired through the acquiring device 730, and when it is determined that there is a need to perform the function, the plurality of electronic control units 710 control the operation of the driving unit 740 that performs the function, and may control an amount of operation on the basis of the acquired information. At this time, the plurality of electronic control units 710 may store the acquired information in the storage device 720 or read and use the information stored in the storage device 720.

The plurality of electronic control units 710 are able to control the operation of the driving unit 740 that performs the function on the basis of the function execution command that is input through the input unit 750, and are also able to check a setting amount corresponding to the information that is input through the input unit 750 and control the operation of the driving unit 740 that performs the function on the basis of the checked setting amount.

Each electronic control unit 710 may control any one function independently, or may control any one function in cooperation with other electronic control units.

For example, when a distance to an obstacle detected through a distance detection unit is within a reference distance, an electronic control unit of a collision prevention device may output a warning sound for a collision with the obstacle through a speaker.

An electronic control unit of an autonomous driving control device may receive navigation information, road image information, and distance information to obstacles in cooperation with the electronic control unit of the vehicle terminal, the electronic control unit of the image acquisition unit, and the electronic control unit of the collision prevention device, and may control one or more of the power device, the brake device, and the steering device using the received information, thereby performing the autonomous driving.

A connectivity control unit (CCU) 760 is electrically, mechanically, and communicatively connected to each of the plurality of electronic control units 710, and communicates with each of the plurality of electronic control units 710.

In some examples, the connectivity control unit 760 is able to directly communicate with a plurality of electronic control units 710 provided inside the vehicle, is able to communicate with an external server, and is also able to communicate with an external terminal through an interface.

Here, the connectivity control unit 760 is able to communicate with the plurality of electronic control units 710, and is able to communicate with a server 810, using an antenna (not shown) and a RF communication.

In some examples, the connectivity control unit 760 may communicate with the server 810 by a wireless communication. At this time, the wireless communication between the connectivity control unit 760 and the server 810 may be performed through various wireless communication methods such as one or more of a GSM (global System for Mobile Communication), a CDMA (Code Division Multiple Access), a WCDMA (Wideband Code Division Multiple Access), a UMTS (universal mobile telecommunications system), a TDMA (Time Division Multiple Access), an LTE (Long Term Evolution), and an NR (New Radio), in addition to or in lieu of a Wi-Fi and a Wireless broadband.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Those of ordinary skill in the art will appreciate that many variations and modifications may be made to the preferred embodiments without substantially departing from the principles of the inventive concepts. Therefore, the disclosed example embodiments are used in a generic and descriptive sense only and not for purposes of limitation. Additionally, example embodiments are not necessarily mutually exclusive. For example, some example embodiments may include one or more features described with reference to one or more figures, and may also include one or more other features described with reference to one or more other figures.

What is claimed is:

1. A volatile memory device comprising:
a memory cell array including a plurality of memory cells configured to store data; and
control logic configured to control read and write operations for the plurality of memory cells,
wherein the control logic is configured to
receive a command instructing a self-refresh operation from an external host device,
perform the self-refresh operation in response to the received command,
request the external host device to issue an initial read command to transfer data stored in the plurality of memory cells in response to a performance time of the self-refresh operation having elapsed a first threshold time,
monitor for an additional read command received from the external host device in response to receiving both a notification of self-refresh operation termination and the initial read command from the external host device, and
enter a power off state in response to the additional read command not being received after a second threshold time has elapsed.

2. The volatile memory device of claim 1, further comprising:
a time setting register configured to store the first threshold time; and
a self-refresh timer configured to
monitor whether the performance time of the self-refresh operation has elapsed the first threshold time based on the first threshold time in the time setting register, and
provide a first control signal to the control logic in response to the performance time of the self-refresh operation having elapsed the first threshold time.

3. The volatile memory device of claim 2, further comprising:
a command timer configured to
monitor for the additional read command provided to the control logic from the external host device, and
provide a second control signal to the control logic in response to the additional read command not being received for the second threshold time.

4. The volatile memory device of claim 3,
wherein the second threshold time is shorter than the first threshold time.

5. The volatile memory device of claim 2,
wherein the first threshold time is provided from the external host device upon the volatile memory device being initialized.

6. The volatile memory device of claim 1,
wherein the control logic is configured to request the external host device to transfer data stored in the plurality of memory cells by transmitting a flag signal to the external host device.

7. The volatile memory device of claim 6,
wherein the control logic is configured to
switch the volatile memory device to an active mode in
    response to the performance time of the self-refresh
    operation having elapsed the first threshold time, and
request the external host device to transfer data stored in
    the plurality of memory cells by maintaining a first data
    port signal transmitted to the external host device at a
    first logic state for a 64BL (Burst length).

8. The volatile memory device of claim 1,
wherein the control logic is configured to
store information in a mode register indicating that the
    performance time of the self-refresh operation has
    elapsed the first threshold time in response to the
    performance time of the self-refresh operation having
    elapsed the first threshold time, and
request the external host device to transfer data stored in
    the plurality of memory cells by having the external
    host device check the stored information in the mode
    register.

9. The volatile memory device of claim 1,
wherein the control logic continues to perform the self-
    refresh operation in response to not receiving a notifi-
    cation of self-refresh operation termination from the
    external host device.

10. The volatile memory device of claim 1,
wherein the volatile memory device includes a DRAM
    (Dynamic Random Access Memory).

11. A System on Chip (SoC) comprising:
a first interface configured to communicate with a volatile
    memory device;
a second interface configured to communicate with a
    non-volatile memory device; and
a controller configured to control the first and second
    interfaces,
wherein the controller is configured to
transmit a command to the volatile memory device
    instructing to perform a self-refresh operation,
receive a request from the volatile memory device to
    transfer data stored in the volatile memory device to the
    non-volatile memory device,
determine whether the volatile memory device has per-
    formed the self-refresh operation in response to a
    vehicle being powered off,
upon determining that the volatile memory device has
    performed the self-refresh operation in response to the
    vehicle being powered off, transmit a read command to
    the volatile memory device in response to the request,
upon determining that the volatile memory device has not
    performed the self-refresh operation in response to the
    vehicle being powered off, transmit a command
    instructing the self-refresh operation to the volatile
    memory device in response to the request,
the controller is further configured to receive data corre-
    sponding to the read command from the volatile
    memory device,
store the received data in the non-volatile memory device,
receive a control signal from a sensor, and
power on the volatile memory device in response to the
    control signal.

12. The SoC) of claim 11,
wherein the controller is further configured to
transmit a first threshold time to the volatile memory
    device upon the volatile memory device being initial-
    ized, and
receive the request from the volatile memory device, after
    transmitting the command instructing the self-refresh operation to the volatile memory device and the first
    threshold time has elapsed.

13. The SoC of claim 11,
wherein the controller is configured to receive the control
    signal from the sensor before the vehicle is powered on.

14. The SoC of claim 11,
wherein the controller is configured to receive the request
    via a flag signal from the volatile memory device.

15. The SoC of claim 14,
wherein the flag signal comprises a signal that a first data
    port signal is maintained at a first logic level for a 64BL
    (Burst Length).

16. The SoC of claim 11,
wherein the controller is configured to receive the request
    by checking information stored in a mode register of
    the volatile memory device.

17. An electronic device configured to be included in a
vehicle, the electronic device comprising:
a volatile memory device configured to store first data
    used for an operation of the vehicle;
a non-volatile memory device configured to store second
    data used for the operation of the vehicle;
a sensor configured to output a control signal in response
    to receiving a detection signal from at least one of a
    door, a seat, and a seat belt of the vehicle; and,
a System on Chip (SoC) configured to power on the
    volatile memory device in response to the control
    signal received from the sensor, and to control the
    volatile memory device and the non-volatile memory
    device,
wherein the volatile memory device is configured to
receive a command instructing a self-refresh operation
    from the SoC,
perform the self-refresh operation in response the
    received command,
request the SoC to transfer data stored in the volatile
    memory device to the non-volatile memory device in
    response a performance time of the self-refresh opera-
    tion having elapsed a first threshold time,
wherein the SoC is configured to,
upon determining that the volatile memory device has
    performed the self-refresh operation in response to the
    vehicle being powered off, in response to the request,
    transmit a read command to the volatile memory
    device,
receive data corresponding to the read command from
    the volatile memory device, and
store the received data in the non-volatile memory
    device,
and upon determining that the volatile memory device has
    not performed the self-refresh operation in response to
    the vehicle being powered off, in response to the
    request,
transmit a command instructing the self-refresh opera-
    tion the volatile memory device.

18. The electronic device of claim 17,
wherein the volatile memory device comprises a time
    setting register configured to store the first threshold
    time; and
a self-refresh timer configured to monitor whether the
    performance time of the self-refresh operation has
    elapsed the first threshold time based on the first
    threshold time of the time setting register.

19. The electronic device of claim 18,
wherein the SoC is configured to provide the first thresh-
    old time to the volatile memory upon the volatile
    memory device being initialized.

20. The electronic device of claim 19,
wherein the volatile memory device further comprises a
command timer configured to monitor the read com-
mand received from the SoC and to monitor whether
the read command is not received for a second thresh-
old time.

\* \* \* \* \*